United States Patent [19]

Simpson et al.

[11] Patent Number: 5,413,812
[45] Date of Patent: May 9, 1995

[54] METHOD FOR FABRICATING NON-DETONABLE EXPLOSIVE SIMULANTS

[75] Inventors: Randall L. Simpson; César O. Pruneda, both of Livermore, Calif.

[73] Assignee: The Regents of the University of California, Oakland, Calif.

[21] Appl. No.: 221,568

[22] Filed: Apr. 1, 1994

Related U.S. Application Data

[62] Division of Ser. No. 27,366, Mar. 8, 1993.

[51] Int. Cl.[6] .............................................. B05D 7/00
[52] U.S. Cl. ................................ 427/212; 102/355; 149/100; 149/109.6; 86/20.1
[58] Field of Search ...................... 427/212; 102/355; 149/100, 109.6; 86/20.1

[56] References Cited

U.S. PATENT DOCUMENTS 4,042,432 8/1977 Breslow ............................... 149/89
4,092,187 5/1978 Hildebrant et al. .................. 149/11

*Primary Examiner*—Shrive Beck
*Assistant Examiner*—David M. Maiorana
*Attorney, Agent, or Firm*—Henry P. Sartorio; L. E. Carnahan

[57] ABSTRACT

A simulator which is chemically equivalent to an explosive, but is not detonable. The simulator has particular use in the training of explosives detecting dogs and calibrating sensitive analytical instruments. The explosive simulants may be fabricated by different techniques, a first involves the use of standard slurry coatings to produce a material with a very high binder to explosive ratio without masking the explosive vapor, and the second involves coating inert beads with thin layers of explosive molecules.

17 Claims, 2 Drawing Sheets

METHOD FOR FABRICATING NON-DETONABLE EXPLOSIVE SIMULANTS

The United States Government has rights in this invention pursuant to Contract No. W-7405-ENG-48 between the United States Department of Energy and the University of California for the operation of Lawrence Livermore National Laboratory.

This is a Division of application Ser. No. 08/027,366 filed Mar. 8, 1993.

BACKGROUND OF THE INVENTION

The present invention relates to the deletion of explosives, particularly to methods for the detection of explosives by instruments or dogs, and more particularly to explosive simulants which are chemically equivalent but not detonable for use in training dogs and calibrating instruments, and to methods for making the simulants.

Various methods and apparatus have been developed for detecting explosives. As the concern of terrorist actions increases, the need to develop but effective explosive detection increases. More recently explosives detecting dogs and sensitive analytical technologies have been utilized. To enable the training of such dogs and/or the calibrating of sensitive instruments, it has been necessary to use large quantities of explosives which pose a hazard as well as preventing dog training or instrument utilization is some critical or restricted areas. For example, during the training of the dogs, quantifies of explosives were carried in vehicles and placed in buildings which resulted in the possibility of explosive detonation. Where explosives were banned due to the location or equipment within an area, training could not be undertaken. Similarly, calibrating of sensitive analytical instruments used for the detection of explosives could only be accomplished by the presence of similar explosives, though in small quantifies, but creating a hazard in and of themselves.

Thus, there has been a need to develop safe methods of training explosives detecting dogs and/or calibrating sensitive analytical instruments without the use of actual explosives. The present invention satisfies that need by providing explosive simulants which are chemically equivalent to explosives in nearly all respects, but cannot chemically react violently (no detonation or explosion). Thus, the use of actual explosives for training and/or instrument calibration could be eliminated, thereby eliminating the hazards associated with the use of explosives, which team is defined herein to mean high explosives as well as gun and rocket propellants. This is basically accomplished by a series of materials which contain small amounts of the actual energetic material to be simulated, but is a minor component overall in a non-reactive matrix.

SUMMARY OF THE INVENTION

It is an object of the present invention to provide non-detonable explosive simulant.

A further object of the invention is to provide a simulator which is chemically equivalent to an explosive, but is not detonable.

A further object of the invention is to provide a method for fabricating non-detonable explosive simulants.

Another object of the invention is to provide methods for producing explosive simulators which involve formulating materials with large surface areas of explosives, but with volume too small to sustain detonation.

Another object of the invention is to provide a method for producing chemically equivalent explosive simulants using slurry coating techniques.

Another object of the invention is to provide a method for fabricating chemically equivalent explosive simulants by coating inert beads with thin layers of explosive molecules.

Other objects and advantages will become apparent from the following description and accompanying drawing, which basically provides safe methods of training explosive detecting or sniffing dogs or calibration of sensitive analytical instruments for explosive detection, without the use of the actual explosives, thereby eliminating hazards associated therewith. The invention involves the fabrication of explosive simulants which are chemically equivalent to explosives, but cannot chemically react violently (not detonable as well as being a non-explosive). The methods for fabricating the explosive simulants involve formulating materials with large surface areas of explosives, but with volumes too small to sustain detonation. These fabrication methods are carried out by either standard slurry coating techniques to produce a material with a very high binder to explosive ratio, and by coating of inert beads with thin layers of explosive molecules.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1A:
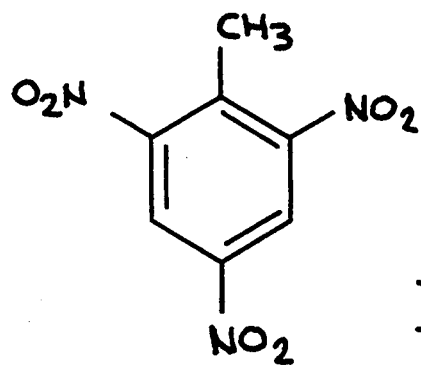
FIGS. 1a and 1b illustrate the molecular make-up of the components, TNT and cyanuric acid, used in explosive simulants fabricated in accordance with the present invention.

The present invention is directed to a means for training dogs to detect (sniff) explosives (including gun and rocket propellants) or for calibrating explosive sensitive analytical instruments. As the potential for terrorist actions involve use of explosives increases, the need to develop safe methods of detection has become more apparent. Currently the use of dogs to sniff-out or detect explosives has greatly increased. To enable these dogs to become proficient, training in various locations and under various conditions becomes essential. In the past, this dog training has been carried out utilizing substantial quantities of explosives which are selectively located in various buildings, areas, etc., and transported by vehicles between training locations. Naturally, training exercises using explosives pose a hazard both to the trainer, the dog, the building or location, and the transport vehicle. Also, in some cases, restrictions on the presence of explosives in a particular building or area may prevent training in some critical areas.

By use of the present invention in the training of explosive detecting dogs, for example, the training can be carried out safely without the hazards of explosive use, and can be carried out in those areas restricted from the presence of explosives. This is accomplished by the use of simulators which are chemically equivalent to explosives, but are not detonable. The simulators would produce the same smell or scent as the actual explosive and thus enable the dog to learn to sniff-out certain explosives. Materials which dogs can be trained to sniff-out or detect include trinitrotoluene (TNT), nitrocellulose, dinitrotoluene, mononitrotoluene, hexahydro-1,3,5-trinitro-1,3,5-traizine (RDX), 2,2-bis [(nitroxy) methyl]-1,3-propanediol, dintrate (PETN), octahydro-1,3,5,7-tetranitro-1,3,5,7-tetrazocine (HMX), and nitroglycerine. With these materials, common dynamites, plastic explosives (Comp. C-4 and Comp. B), could be simulated.

For detection techniques which rely on vapor signatures, such as the olfactory sense of dogs or chemical mass spectral techniques, adequate gas concentrations can be met by maintaining a very large surface areas of the energetic material, but a small mass and volume fraction relative to the inert component. Explosiveness, burn rate, and ignition properties can be minimized by using small quantities of the energetic component and selecting the major component so that it is very non-reactive, has a high heat capacity and density, low thermal conductivity, and has a low modulus to reduce the localized deposition of energy due to mechanical loading.

In principle, a simulant can be developed that can be used to mock vapor signatures as well as the chemical compositions of pure explosives. The recently developed technique of neutron backscattering analyzes for nitrogen to detect the large concentrations that are found in explosives. Selecting a non-reactive component that is nitrogen rich, in conjunction with the nitrogen rich energetic phase, should be adequate to simulate most energetic materials for this method of detection and other non-invasive approach.

Thus, the non-detonable explosive simulants of the present invention are fabricated by methods which involve formulating materials with large surface areas of explosives, but with volumes too small to sustain detonation. Two fabrication methods or techniques are set forth hereinafter wherein the quantity of the nonexplosive material is greater in proportion than the quantity of the explosive material. The first method uses standard slurry coating techniques to produce a material with a very high binder to explosive ratio. The binders are to be selected and treated so that they would not mask the explosives vapor. The second method involves coating inert beads (5–10 $\mu$m) with thin layers of explosive molecules. A variety of different substrates can be used ranging from polystyrene to ceramic materials. Mass spectral analysis has been carried out to verify that certain explosives and their explosive simulants produce analogous vapor signatures.

Figure 1B:
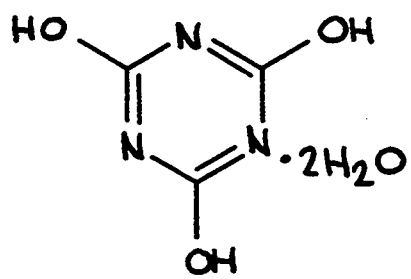

A TNT simulant has been fabricated in accordance with the present invention, with cyanuric acid as the non-reactive component. The molecular make-up of each of TNT and cyanuric acid, respectively, is illustrated in FIGS. 1a and 1b, with the following chemical characteristics of cyanuric acid being MW:165.11, m.p.:360° C., b.p.:decomposes, density:1.768 g/cm$^3$, solubility:water, slightly in alcohols. Formulation of the two TNT/cyanuric acid simulants was carried out to verify the invention using standard slurry coating techniques, which basically involved the TNT being dissolved in acetone, the cyanuric acid was then added to the TNT/acetone solution, and while maintaining vigorous mixing, the solvent (acetone) was removed by vacuum air sweep and heating to 50° C. The compositions of these two formulations, identified as RS-01-AA and RS-01-AB, are set forth hereinafter in Table I:

TABLE I

| | Formulation Compositions | | |
|---|---|---|---|
| Simulant | Cyanuric:TNT wt. % | Cyanuric:TNT vol. % | TMD[a] (g/cm$^3$) |
| RS-01-AA | 80.0:20.0 | 78.9:21.1 | 1.744 |
| RS-01-AB | 90.0:10.0 | 89.4:10.6 | 1.756 |

[a]Theoretical Maximum Density

By way of specific example, the TNT/cyanuric acid formulation was carried out as follows:

1. 150 grams of TNT was dissolved in 750 grams of solvent composed of acetone at a temperature of 25° C.
2. 1350 grams of cyanuric acid was added to the thus formed TNT/acetone solution at a temperature of 50° C.
3. The thus formed TNT/acetone/cyanuric mixture was submitted to vigorous mixing in a mixer operating at a medium speed setting, the mixer, for example, being a 1-gallon Baker-Perkin Vertical High Shear Mixer.
4. While maintaining the vigorous mixing, the solvent was removed by vacuum air sweep in a mixer operating at a medium speed and vacuum of less than one atmosphere, while heating the mixture to 50° C. for a time period of 25 minutes, which produced 1500 grams of TNT simulation.

Small scale safety tests were performed on the formulation compositions set forth above in Table I, and the result of the safety tests are listed hereinafter in Table II:

TABLE II

| | Small Scale Safety Test Results | | | | |
|---|---|---|---|---|---|
| Simulant | Impact[a] (cm) | Friction[b] (kg) | Spark[c] | CRT[d] (cm$^3$/g) | DSC[e] (°C.) |
| RS-01-AA | off-scale | off-scale | no rxn | 0.016 | 250 |
| RS-01-AB | off-scale | off-scale | no rxn | 0.044 | 250 |

[a]2.5 kg Type 12 tool with 35 mg pressed samples.
[b]Julius-Peters-Berlin 21 friction machine. One reaction in ten tries.
[c]Ten tries at 1J with 510Ω in line resistance.
[d]Chemical Reactivity Test 22 h at 120° C. under 1 atm He. Reported in cm$^3$/g.
[e]Differential Scanning Calorimetry Onset of exotherm.

Figure 2:
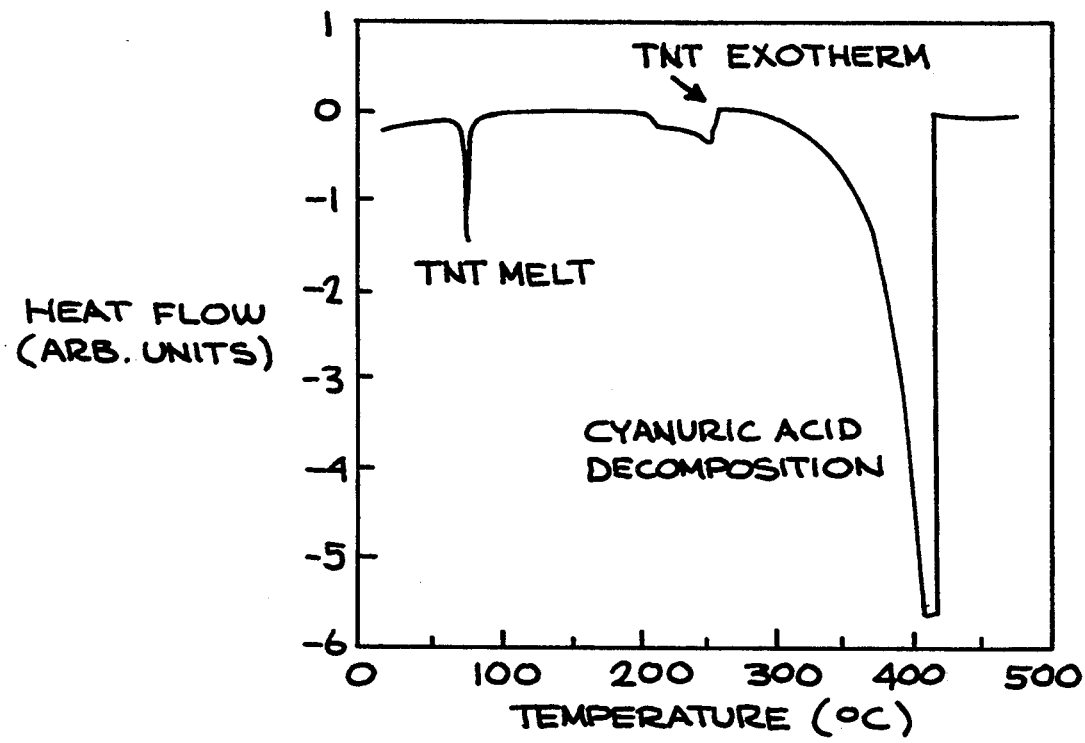
FIG. 2 is a graph illustrating differential scanning calorimetry results with a first explosive simulant at a scan rate of 10° C./min.
Figure 3:
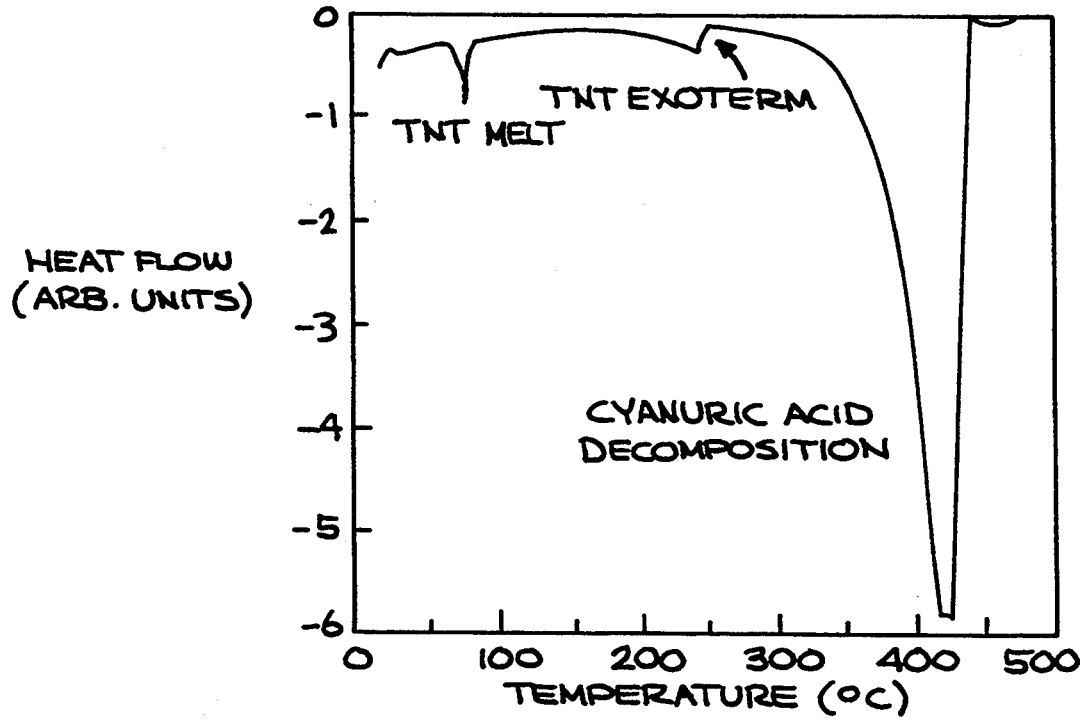
FIG. 3 is a graph similar to FIG. 2 of a second explosive simulant.

The thermal stability results of the two simulant formulations RS-01-AA (20% TNT) and RS-01-AB (10% TNT) as determined by differential scanning catorimetry, are respectively shown in FIGS. 2 and 3. The TNT solid-to-liquid phase transition can be identified at 80° C. At 250° C. there is a small exotherm due to TNT decomposition. The large endotherm beginning at 300° C. is attributed to the decomposition of cyanuric acid.

To examine sensitivity to shock, two plate dent experiments were performed. Parts that were 12.7 mm long and 12.7 mm in diameter were pressed with each of the two simulant formulations. Pressures of 200 MPa without vacuum and at ambient temperature yielded samples having densities of 92.5% TMD and 90.5% TMD with material formulations RS-01-AA and RS-01-AB, respectively. Initiation (detonation) was attempted with each material using RP-87 detonators. No deformations to mild steel plates adjacent to the simulants were produced by either material. Analysis of the recovered fractured simulant parts showed no visible evidence of reaction (detonation).

Flammability tests to ascertain the burn properties of the TNT simulants, tests for the possibility of chemical incompatibilities between TNT and the cyanuric acid, and tests relative to the TNT of the simulant decomposing over a period of time, have been completed successfully. Both the TNT simulant formulations RS-01-AA and RS-01-AB, described above, which have been scaled to 1500 g, have met or exceeded expectations in regard to processing and small scale sensitivity tests.

Figure 4:
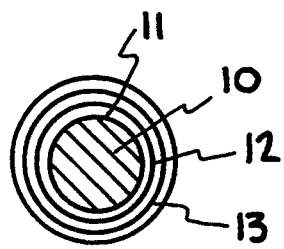
FIG. 4 is a cross-section of an embodiment of a coated bead forming an explosive simulant.

The second method for producing explosive simulants in accordance with the invention involves coating inert beads, as shown in FIG. 4 at 10, composed of inert material such as cyanuric acid, melamine, glass beads and sand having a diameter of 5-$\mu$m, with thin 1 to 100 $\mu$layers, indicated at 11, 12, and 13 in FIG. 4, of explosive molecules, such as TNT, RDX and nitrocellulose. The number of coated layers may vary from 1 to 100. By way of example, the method may be carried out by the following sequence of operational steps:
1. Selecting inert beads constructed of cyanuric acid having a diameter of 5-10 $\mu$m; and
2. Coating the beads with a number (1 to 100) of layers, each having a thickness of 1-100 $\mu$m, with TNT molecules by the following procedure:
   a. dissolving TNT molecules in acetone solvent to form a lacquer,
   b. mixing cyanuric acid with the lacquer,
   c. heating the mixture to 55° C. while stirring in a vertical high shear mixer at medium speed while pulling of vacuum.

It has thus been shown that the present invention provides a nondetonable explosive simulator, a testing has shown the explosive simulant formulations are insensitive to impact, spark, friction, temperature, and shock. These explosive simulants have been scaled to 1.5 kg quantities for use in field evaluation by explosives detecting canines. Thus, the training hazards posed by the use of actual explosives and the increased costs due to training, shipping, storage, and security requirements may be substantially reduced by utilizing the explosive simulants. In addition, by use of explosive simulants, training can be carried out in critical areas previously forbidden. Thus, the present invention substantially advances the field of explosive detection training, be it by canines or sensitive instruments.

While particular methods, materials, parameters, etc. have been described and/or illustrated, such is not intended to limit the scope of this invention. Modifications and changes will become apparent and it is intended that the scope of the invention be limited only by the scope of the appended claims.

We claim:

1. A method for fabricating an explosive simulant having at least scent and elemental equivalents to an explosive material, comprising the steps of:
   forming a solution by dissolving a quantity of an explosive material in a solvent;
   adding a quantity of non-explosive material to the thus formed solution, the quantity of non-explosive material being greater in proportion than the quantity of explosive material; mixing the solution; and removing the solvent from the solution.
2. The method of claim 1, wherein the step of removing the solvent is carried out by the steps of vacuum air sweeping the solution and heating the solution to a specified temperature while vigorously mixing the solution.
3. The method of claim 1, additionally including the steps of providing a quantity of TNT as the explosive material, and providing a quantity of cyanuric acid as the non-explosive material in a weight percentage of about 10-20 percent TNT and about 80-90 percent cyanuric acid; and providing acetone as the solvent in which the TNT is dissolved.
4. The method of claim 3, wherein the step of removing the solvent includes the steps of vacuum air sweeping and heating to 50° C. while maintaining mixing of the solution.
5. The method of claim 4, wherein the step of mixing is carried out in a vertical high shear mixer at a vigorous agitation.
6. The method of claim 5, wherein the step of vacuum air sweeping is carried out by pulling a vacuum of less than one atmosphere.
7. A method for forming an explosive simulant having characteristics of an explosive material but being incapable of detonation or explosion, comprising the steps of:
   forming beads from a non-explosive material; and
   coating the thus formed beads with at least one layer of an explosive material, the quantity of non-explosive material being greater than the quantity of explosive material so as to render the explosive simulant non-detonable and non-explodable.
8. The method of claim 7, wherein the coating step is carried out by using explosive molecules as the explosive material being coated on the beads.
9. The method of claim 7, wherein the step of forming the beads is carried out such that the beads have a diameter of about 5-10 $\mu$m.
10. The method of claim 7, wherein the beads are formed from inert material selected from the group consisting of cyanuric acid, melamine, sand and glass beads; and
    wherein the at least one coating is formed from material selected from the group consisting of TNT, RDX, HMX and nitrocellulose.
11. A method for fabricating an explosive simulant which cannot chemically react to produce detonation or explosion thereof, comprising:
    providing a quantity of an explosive material;
    providing a quantity of a non-explosive material; and
    combining the explosive material and non-explosive material such that the combined material produces at least scent and elemental equivalents to the explosive material.
12. The method of claim 11, additionally including selecting the explosive material from the group consisting of TNT, RDX, HMX, and nitrocellulose, and selecting the non-explosive material from the group consisting of cyanuric acid, melamine, sand and glass beads.
13. The method of claim 11, wherein the combining of the materials is carried out by:
    forming beads of the non-explosive material; and
    providing the thus formed beads with a coating of explosive material;
    the quantity of non-explosive material being greater in proportion than the quantity of explosive material.
14. The method of claim 13, additionally including forming the beads of non-explosive material to have a diameter of 5-10 $\mu$m, and coating the beads with the explosive material to a thickness of 1 to 100 $\mu$m.

15. The method of claim 13, wherein the coating with explosive material is carried out by using explosive molecules as the explosive material.

16. The method of claim 11, wherein the quantity of explosive material is composed of TNT, and wherein the quantity of non-explosive material is composed of cyanuric acid.

17. The method of claim 11, wherein the combining of the materials is carried out by:
 forming a solution by dissolving the explosive material in a solvent;
 adding the non-explosive material to the thus formed solution, the non-explosive material being greater in proportion than the explosive material;
 mixing the solution; and
 removing the solvent from the solution.

* * * * *